United States Patent [19]
Conklin et al.

[11] 3,750,711
[45] Aug. 7, 1973

[54] METHOD AND APPARATUS FOR TESTING FOR LEAKS IN PIPES

[75] Inventors: James T. Conklin; James B. Rogers, both of Orlando, Fla.

[73] Assignee: Penetryn Systems, Inc., Willoughby, Ohio

[22] Filed: Mar. 24, 1971

[21] Appl. No.: 127,712

[52] U.S. Cl. ................................. 138/97, 73/40.5
[51] Int. Cl. ............................................. F16l 55/18
[58] Field of Search .................... 138/97; 73/40.5

[56] References Cited
UNITED STATES PATENTS

| | | | |
|---|---|---|---|
| 3,199,598 | 7/1962 | Loomis | 138/97 X |
| 3,618,639 | 11/1971 | Daley et al. | 138/97 |
| 3,606,913 | 9/1971 | Yie | 138/97 |
| 3,453,869 | 7/1969 | Cheine | 73/40.5 R |
| 3,400,574 | 9/1968 | Cramer | 73/40.5 R |
| 3,254,528 | 6/1966 | Michael | 73/40.5 R X |

Primary Examiner—Herbert F. Ross
Attorney—Duckworth & Hobby

[57] ABSTRACT

A method and apparatus for testing for leaks in pipes is provided utilizing a packer apparatus with inflatable end portions to isolate a void area in the pipe and feeding air to the isolated area and measuring the air pressure in the void area, along with the flow of air into the void area to determine the rate of leakage from the area.

11 Claims, 2 Drawing Figures

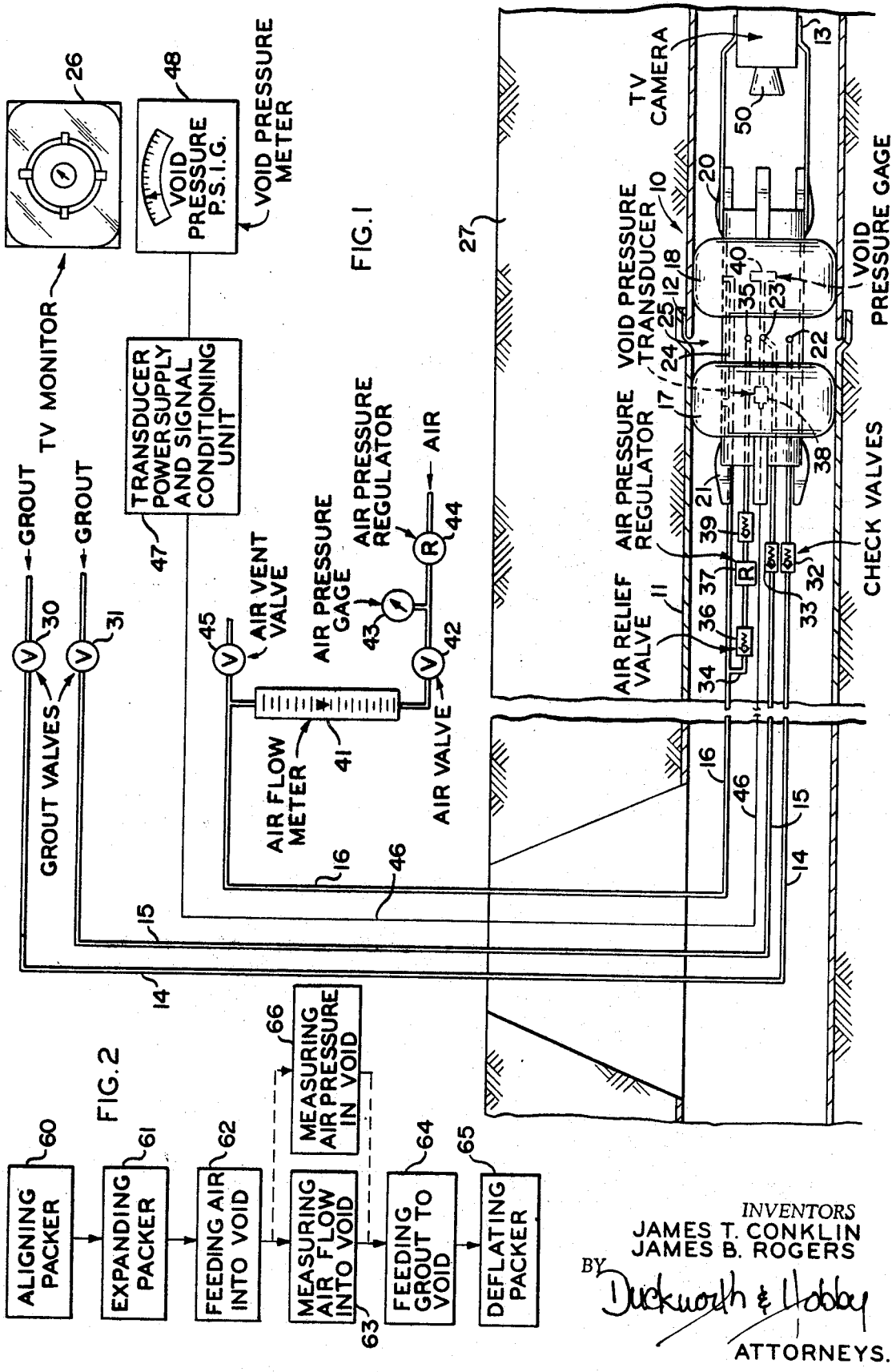

METHOD AND APPARATUS FOR TESTING FOR LEAKS IN PIPES

BACKGROUND OF THE INVENTION

1. Field of the Invention

The present invention relates to the internal sealing of pipe leaks and especially to a system for determining whether joints between pipe sections are leaking and the approximate rate of leakage. The present system has been adapted for use with those systems utilizing packers for internal sealing of pipe leaks utilizing fast-setting chemical grouts and especially to those systems in which a television camera in a sealed unit is pulled through a sewer line, or the like, for detecting leaks or faults in the sewer line and to assist in positioning of the packer for a fast and easy sealing of the leak by remote control from a mobile unit located near the entrance to the pipe line. These systems have been satisfactory, but at times it is difficult to determine whether a leak exists at joints between pipe sections, which might thereby seal such a joint in case of doubt. The present invention provides an apparatus and method for determining whether a leak exists at a joint between sections of a line, and the approximate rate of leakage.

2. Description of the Prior Art

Pipes, such as sewer lines, frequently develop leaks, particularly at the joints between sections of the pipe. Prior to the development of television cameras and internal pipe sealing units, the repair of subterranean pipe lines to correct the infiltration of water, and the egress of sewage, had been to calculate strategic locations of infiltrations and then to evacuate along the pipe line until the leak was located and the repair made. This, however, was time consuming and expensive in the correction of faults in subterranean lines, and it was extremely difficult to locate the exact site of a leak in the pipe. This resulted in experimentations for better ways of locating leaking joints and resulted in sealed camera units, such as TV cameras having lighting units for pulling through the pipe lines to examine the interior of the pipe lines for faults, root damage, and the like. Once a fault or leak was discovered in the pipe and pinpointed with a camera, a hole could be drilled to a spot near the leak and sealing materials fed through conduits would repair the leak. This particular method and apparatus was described in U. S. Pat. No. 2,971,259, entitled METHOD AND APPARATUS FOR DETERMINING THE POSITION OF SEWER LEAKS by Robert F. Hanou and Edward Diehle Toole, and assigned to the assignee of the present invention.

The next step involved the development of a mechanism for internally seaing a pipe leak, having a packer movable within the pipe along its length for injecting a plugging material into the leak. Such a packer was described in U. S. Pat. No. 3,168,908 for MECHANISM FOR THE INTERNAL SEALING OF A PIPE LEAK by James A. Zurbrigen and Jack C. Steinsberger and assigned to the assignee of the present invention. This type of sealing packer was used in association with an enclosed television camera to provide a method for sealing and repairing internal leaks in sewer lines by moving the packer along the pipe until a leak was detected by the television camera, and a target located a fixed distance from the packer positioned under the leak, then advancing the packer a predetermined distance to place the packer directly over the leak, then isolating the leak with the packer and injecting the sealing material. This method was illustrated in U. S. Pat. No. 3,168,909 for A METHOD FOR LOCATING AND SEALING PIPE LEAKS by James A. Zurbrigen and Jack C. Steineberger, and assigned to the assignee of the present invention. Finally, an improved packer mechanism for use with fast gelling chemical grout was provided in the U. S. Pat. No. 3,103,235 intitled SLEEVE PACKER FOR CHEMICAL GROUTING by Edward B. Stringam III, and assigned to the assignee of the present invention in which a sleeve type packer was provided having a sleeve covered by an inflatable bladder and sealed at each end, and having another rigid sleeve placed over the bladder and in the middle thereof, to provide a packer adapted for fast gelling grouts.

A principal object of the present invention is to provide a leak testing method and apparatus for use with prior art packers having inflatable end portions for determining leaks especially in pipe joints and the approximate size of such leaks and to assure that the packer is properly located on such leaks.

SUMMARY OF THE INVENTION

A leak testing appartus is provided for determining whether a leak exists in a pipe line, in combination with a sleeve type packer for use with fast setting chemical grouts for sealing a leak or pipe joint remotely. A sleeve packer has inflatable end portions adapted to be placed in a subterranean pipe line and having grouting lines connected from the packer to a mobile unit located near the entrance to the subterranean line, and also having a fluid line such as an air line connected to a packer to inflate the inflatable end portions to form an isolated or void area inside the pipe line between the inflated end portions. A pressure transducer is located in the packer to measure the pressure in the void area, and the air line can be adapted to feed air into the void area so that the flow of air can be measured entering the void area to determine the rate of leakage from the void area and the pressure in the void area can be measured with the transducer to determine if the area can maintain predetermined pressure. Grout lines are connected to the packer for feeding fast-setting chemical grouts to the void area for sealing a leak determined by the air flow and pressure test. A method for testing for leaks in pipes utilizing a packer with inflatable end portions is also provided including aligning a packer over a predetermined position in a pipe to be tested expanding pairs of inflatable portions of the packer to isolate a void area between the inflatable portions, feeding air to the void area and measuring the air flow into the void area to determine the rate of leakage from said void area, if any, and also including measuring air pressure in the void area. Method also includes blocking the grout lines from the air being fed to the void area but allowing the chemical grouts to pass therethrough during the grouting operation and for the same air line that inflates inflatable portions of the packer to allow air to enter the void area upon reaching a predetermined pressure and for regulating the pressure being fed to the void area. The apparatus also provides for air pressure regulation of the air entering the void area and for using the same air line inflating the inflatable bladder portions of the packer to feed the void area upon a predetermined pressure being reached to the air line and for valving means to block air from entering the grouting lines prior to the grouting operation beginning. A pressure gauge can be utilized with a television camera in lieu of the transducer for reading void pressure remotely without the necessity of providing additional lines between the packer and the remote control unit.

BRIEF DESCRIPTION OF THE DRAWINGS

Other objects, features and advantages of this invention will be apparent from a study of the written description of the drawings in which:

FIG. 1 is a schematic drawing illustrating an appartus in accordance with the present invention along with its operation; and FIG. 2 is a flow diagram of a method in accordance with the present invention.

DESCRIPTION OF THE PREFERRED EMBODIMENTS

Referring now to FIG. 1 of the drawings, there can be seen a packer 10 located inside a subterranean pipe line 11 which could typically be a subterranean sewer line having joints 12 between a pair of sections of the line 11. Packer 10 has a TV camera 13 connected to one end and has a pair of grouting lines 14 and 15 connected thereto along with an air line 16. Air line 16 is connected to the packer 10, bladders or inflatable portions 17 and 18 for expanding these bladders on either end portion of the packer 10 when air is passed through the line 16. Packer 10 also has a pair of skids 20 and 21 for the packer to slide along the pipe 11 when the bladders 17 and 18 are in a deflated position while locating the packer in a desired location such as over a joint 12. Grout lines 14 and 15 have openings 22 and 23 through a sleeve 24 located between the bladder 17 and 18 for feeding a fast-setting chemical grout into an area defined by the inflated bladders 17 and 18, sleeve 24 and the pipe 11 inner surface. The two chemicals in the grout mix in the void area 25 under pressure to seal the leak in a joint 12. The joint is first located by the TV camera 13 sliding through the pipe 11 along with a light acting in conjunction with a TV monitor 26 whereby the operator can see the joint or pipe leak and align the packer by locating a target, such as the packer, directly over the joint 12 and then moving the packer 10 a predetermined distance to align the packer on the joint. Pipe 11 of the present apparatus is shown as a subterranean pipe beneath the earth 27 but it will of course be clear that the apparatus can be used with any pipe which it is desirable to locate and seal leaks in remotely. The grout pipes 14 and 15 have grout valves 30 and 31 respectively located above the earth 27 whereby at the proper time they may be turned on to fill the void area 25 with grout to seal the leak in the pipe 11.

In the present system a pair of check valves 32 and 33 are respectively placed in the lines 14 and 15 near the packer 10. These check valves prevent air which is to be fed under pressure into the void 25 from passing into the grout lines 14 and 15, past the check valves 32 and 33. The air line 16 in addition to being connected to each of the bladders 17 and 18 for filling bladders, also has a line 34 opening at 35 through the sleeve 24 for passing air into the void area 25. An air relief valve 36 located in line 34 prevents air passing through this line until a predetermined pressure is reached and an air pressure regulator 37 located in the line 34 allows air to enter the void area 25 at a predetermined air pressure while a check valve 39 prevents grout from gelling into the air line during the grouting operation. Thus, air at a predetermined pressure such as 30 lbs., will fully inflate the bladders 17 and 18 and by increasing this pressure to say 35 lbs., the air relief valve 36 will open but air pressure regulator 37 will only allow a smaller pressure such as 6 lbs. in the void 25. This allows the air to be fed from a single line without placing such a large pressure in the void area 25 as to overcome the resistance of the bladders 17 and 18.

The present invention is described in terms of utilizing air in line 16 because air is a low-cost fluid which provides a revealing test for testing for leaks in the joint 12 and is a compressible fluid. However, it should be clear that other fluids could be used in the present system without departing from the spirit and scope of the invention.

Once the packer 10 is aligned with the joint 12 by the TV camera 13 and the bladders 17 and 18 inflated for grouting the joint, it is still difficult in cases of joints like 12 to determine if there is a leak in the joint, since a joint unlike other leaking or damaged areas in internal pipes will normally not look any different from other joints unless water can be seen leaking into the pipe. It is also desirable to be sure that the packer is properly aligned with the joint 12. Air is fed through line 34 into the void area 25, where it applies air pressure which will maintain itself in the absence of a leak in the joint 12. This pressure can be read by pressure transducer 38 and measured on a visual pressure gauge 40. If the pressure does not maintain itself, it can be determined that there is a leak in the joint 12. Alternatively, once the bladders 17 and 18 have been filled and air is being fed into the void 25, the flow of air can be measured on an airflow meter 41 to determine the rate of flow of air through line 16 and into the void 25, and then leaking out of the void area 25 so that the rate of leakage of air through the leak in the joint 12 can be determined. The external controls also provide for an air valve 42 for turning the air on as desired. Air pressure gauge 43 is for determining the air pressure being applied to the line 16 and air pressure regulator 44 is for regulating the pressure of the air being fed to the line 16. The system also provides for an air vent valve 45 for releasing the air pressure from the line 16 upon completion of the operation. The present system can determine whether the void 25 isolated by the bladders 17 and 18 can maintain a predetermined amount of air pressure and if not, can determine the flow of air into the void 25 to determine the seriousness of the leak in the joint 12. Once it is determined that the leak exists in joint 12, and that the packer is properly located for sealing the leak 12, the grout valves 30 and 31 can apply chemical grouts through lines 14 and 15 into the void 25 for sealing the leaks in the joint 12.

A plural conductor line 46 provides input and output signals to and from the transducer 38, from the transducer power supply and signal conditioning unit 47. The void pressure meter 48 displays the psig in the void area 25 at the remote control unit. The void pressure gauge 40 is an alternative way of providing pressure reading in the void area 25 in larger packers. It is visible to the lens 50 of the TV camera 13 and can be read by the remote monitor 26 without having additional gauges or lines connected from the packer to the remote control unit. This gauge is connected directly to the void area 25.

It should be realized at this point that there are three ways to test for a leak in the pipe joint 12, in accordance with the present invention. The first provides for the air flow through pipe 16 being measured with the air flow meter 41 to determine the rate of leakage from the void area 25. The second measures the air pressure in the void area 25 with a pressure transducer 38 based on the air that is being applied to the void area through the pipe 34. However, the transducer 38 in connection with the pressure meter 48 or the pressure gauge 40 can be operated to measure the pressure in the void area 25 caused by the bladders 17 and 18 expanding to seal off the void area 25. These expanding bladders contact the internal surface of the pipe 11 first sealing the void area 25 and continued expansion of the bladders reduces the volume in void area 25 to produce a pressure in the void area 25, which pressure such as ½ PSI or less, can be read by a sensitive transducer 38 but is too small to be read by a pressure gauge 40 for determining that the void area 25 maintains the pressure therein and whether a leak actually exists in the joint 12. The air pressure testing methods can determine the size of the leak generally by how long the void area 25 maintains its air pressure. The air flow meter 41 which is providing a continuous flow of air into the void area 25 as it leaks off at predetermined pressures provides probably a more accurate measurement of the size of the leak.

The present invention advantageously requires no extra hoses to gel up with grouting chemicals. The system is compatible with all three hose type sealing equipment having two grouting lines and an air line and the joint can be tested, sealed and retested all in one operation. The pressure transducer 38 can be of any known types of pressure transducers especially electric transducers which advantageously prevents chemicals from stopping up gauges such as happens in the usual type of pressure gauge. While applicants do not intend to be limited to any particular type of pressure transducer, one such unit is provided by G. M. Giannini & Company, Inc., Pasadena, California, in their oil filled pressure transducers Series 46,155. These pressure transducers advantageously measure pressure in the void area and transmit pressure data to the mobile unit or to a pressure gauge connected to the packer which is read by the TV camera and provides very high accuracy and eliminates the use of hoses for sensing pressure, which hoses are subject to leaks and clogging. The air pressure regulator 37 can be any type of regulator desired for air but it is desirable to have a small or miniature type regulator many of which are commercially available.

An advantage obtained by the use of the present invention is that during the chemical grouting process, the grout pressure in the void area is known by utilizing the pressure transducer regardless of visibility conditions. The grout valves can thus be utilized to throttle the grout so that the grout pressure within the void area does not exceed the pressure retaining capability of the packer sleeves with resultant waste of grout.

Referring now to FIG. 2, a flow diagram illustrating the general method in accordance with the present invention is illustrated in which the step of aligning the packer 60 in accordance with prior art techniques is first performed, then expanding the packer 61 to form the void area 25 of FIG. 1. The next step is feeding air into the void 62 and measuring 63 the air flow into the void where the air flow meter 41 of FIG. 1, feeding 64 grout to the void to seal the leak if it is determined that a leak exists, then deflating 65 the packer 10 of FIG. 1. An alternative method or step is illustrated as measuring 66 the air pressure in the void 25 of FIG. 1.

It should be clear at this point that a method and apparatus have been provided for determining whether a leak exists in a pipe from a remote point and for determining the rate of leakage under predetermined pressures. The system described is especially adapted for use with conventional subterranean pipe sealing units utilizing television cameras in sealed units along with packers for isolating portions of a pipe and grouting with grouting lines connected to the packer units. However, this invention is not to be construed as limited to the particular forms disclosed herein since these are to be regarded as illustrative rather than restrictive.

We claim:

1. An apparatus for determining whether a leak exists in a pipe line in combination with a packer for sealing said leak remotely, comprising in combination:
   a. packer means having inflatable end portions to be placed in a pipe line;
   b. first fluid line means connected to said packer and to a fluid supply for inflating said inflatable end portions to form a void area in said pipe line between said inflatable end portions;
   c. second fluid line means connected through said packer to said void area for applying a fluid under pressure to said area;
   d. void pressure measuring means operatively connected to said packer for measuring the leakage of fluid from said void area when said inflatable end portions are inflated and fluid has been applied to said void area from said second fluid line means;
   e. grout line means connected from a grouting chemical source to said packer for filling said void area with a grouting chemical when said void pressure measuring means indicates a leak in said pipe line, whereby only proven leaks require grouting; and
   f. means to block said second fluid line means during filling of said void with a grouting chemical to prevent grouting chemicals from blocking said second fluid line means, and means to block said grout line means during filling of said void with fluid to prevent fluid from entering said grout lines.

2. The apparatus according to claim 1 in which said first fluid line means is connected to said second fluid line means and includes a valve means adapted to open said first fluid line to said second fluid line means and to said void area only upon a predetermined fluid pressure being reached in said first fluid line means.

3. The apparatus according to claim 2 in which said second fluid line means has a pressure regulator for regulating the pressure of fluid being fed to said void area.

4. The apparatus according to claim 2 in which a fluid line measuring means is connected to said first fluid line means for measuring the flow of fluid into said void area following the expansion of said inflatable end portion of said packer whereby the rate of leakage from said void area can be determined.

5. The apparatus according to claim 1 in which said grout line means has check valve means therein to prevent fluid being fed to said void area by said second fluid line means from entering said grout line means past said check valves.

6. The apparatus according to claim 2 in which said first and second fluid line means are air lines connected together and to a source of air under pressure.

7. The apparatus according to claim 1 in which said packer is connected to a TV camera used for locating potential leaks in pipe lines, and said void measuring means is pressure gauge connected to said void area for measuring the pressure in said void area, said pressure gauge being located in a position where said TV camera can view said pressure gauge.

8. The apparatus according to claim 1 in which said void measuring means includes a pressure transducer connected to said void area and having an electrical connection for a remote meter for remotely reading the pressure in said void area.

9. A method for testing for leaks in pipes utilizing a packer having inflatable end portions for isolating a void in a pipe line between, the inflatable end portions comprising the steps of:
   a. aligning said packer over a predetermined position in a pipe line to be tested;
   b. expanding said inflatable end portions on said packer to isolate a void area in a pipe line between said inflatable end portions of said packer;
   c. feeding air into said void area;
   d. measuring the leakage of air from said void area to determine the leakage of air from said void area;
   e. feeding a grouting chemical through grout lines into said void area to seal a leak in said pipe line including the step of blocking air from entering said grout lines during the feeding of air to said void area and
   f. blocking grouting chemical from entering said air line from said void area while feeding grouting chemical to said void area, whereby tested leaks may be sealed.

10. The method according to claim 9 including the step of measuring the air pressure in said void area to determine if said pressure is being maintained.

11. The method according to claim 9 in which said steps of expanding said inflatable portions of said packer and feeding air to said void area utilize a common air line by pressure switching air into said void area from said air line upon a predetermined pressure being reached in said air line.

* * * * *